US011757503B2

(12) United States Patent
Zhang et al.

(10) Patent No.: US 11,757,503 B2
(45) Date of Patent: Sep. 12, 2023

(54) UE PANEL SPECIFIC BEAM APPLICATION TIME

(71) Applicant: QUALCOMM Incorporated, San Diego, CA (US)

(72) Inventors: Qian Zhang, Basking Ridge, NJ (US); Yan Zhou, San Diego, CA (US); Junyi Li, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 17/119,718

(22) Filed: Dec. 11, 2020

(65) Prior Publication Data

US 2022/0190895 A1 Jun. 16, 2022

(51) Int. Cl.
*H04W 72/04* (2023.01)
*H04B 7/06* (2006.01)
*H04W 8/24* (2009.01)
*H04W 52/02* (2009.01)
*H04W 72/0446* (2023.01)
*H04W 80/02* (2009.01)
*H04W 72/23* (2023.01)

(52) U.S. Cl.
CPC ......... *H04B 7/0608* (2013.01); *H04B 7/0617* (2013.01); *H04W 8/24* (2013.01); *H04W 52/0206* (2013.01); *H04W 72/0446* (2013.01); *H04W 72/23* (2023.01); *H04W 80/02* (2013.01)

(58) Field of Classification Search
CPC ............... H04W 8/24; H04W 52/0206; H04W 56/0015; H04W 72/0426; H04W 72/0446; H04W 80/02; H04L 5/0098; H04B 7/0626; H04B 7/0617; H04B 7/0608
See application file for complete search history.

(56) References Cited

U.S. PATENT DOCUMENTS

| 9,572,063 | B2 * | 2/2017 | Etemad ............... H04L 41/0823 |
| 2013/0170435 | A1 | 7/2013 | Dinan |
| 2017/0111094 | A1 * | 4/2017 | Sartori ................ H04B 7/0695 |
| 2019/0260456 | A1 | 8/2019 | Zhou et al. |
| 2022/0110109 | A1 * | 4/2022 | Tsai .................. H04W 56/0015 |

OTHER PUBLICATIONS

International Search Report and Written Opinion—PCT/US2021/052717—ISA/EPO—dated Jan. 27, 2022.

* cited by examiner

*Primary Examiner* — Wei Zhao
(74) *Attorney, Agent, or Firm* — Procopio, Cory, Hargreaves & Savitch LLP

(57) ABSTRACT

A configuration for reporting a beam application time for a specific beam at an antenna panel of a UE. The apparatus transmits, to a base station, a beam application time report for at least one antenna panel of the UE, wherein the beam application time report comprises a time for application of a beam for use by the at least one antenna panel. The apparatus applies the beam at the at least one antenna panel of the UE based on the beam application time report in preparation of communication with the base station. The apparatus communicates with the base station using the beam of the at least one antenna panel at least at a time based on the beam application time report.

30 Claims, 8 Drawing Sheets

UE PANEL SPECIFIC BEAM APPLICATION TIME

BACKGROUND

Technical Field

The present disclosure relates generally to communication systems, and more particularly, to a configuration for reporting a beam application time for a specific beam at an antenna panel of a user equipment (UE).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus transmits, to a base station, a beam application time report for at least one antenna panel of the UE, wherein the beam application time report comprises a time for application of a beam for use by the at least one antenna panel. The apparatus applies the beam at the at least one antenna panel of the UE based on the beam application time report in preparation of communication with the base station. The apparatus communicate s with the base station using the beam of the at least one antenna panel.

In an aspect of the disclosure, a method, a computer-readable medium, and an apparatus are provided. The apparatus may be a device at a base station. The device may be a processor and/or a modem at a base station or the base station itself. The apparatus receives, from a user equipment (UE), a beam application time report for at least one antenna panel of the UE, wherein the beam application time report comprises a time for application of a beam for use by the at least one antenna panel. The apparatus applies a beam at an antenna array of the base station based on the beam application time report in preparation of communication with the UE. The apparatus communicates with the UE using the beam of the antenna array of the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
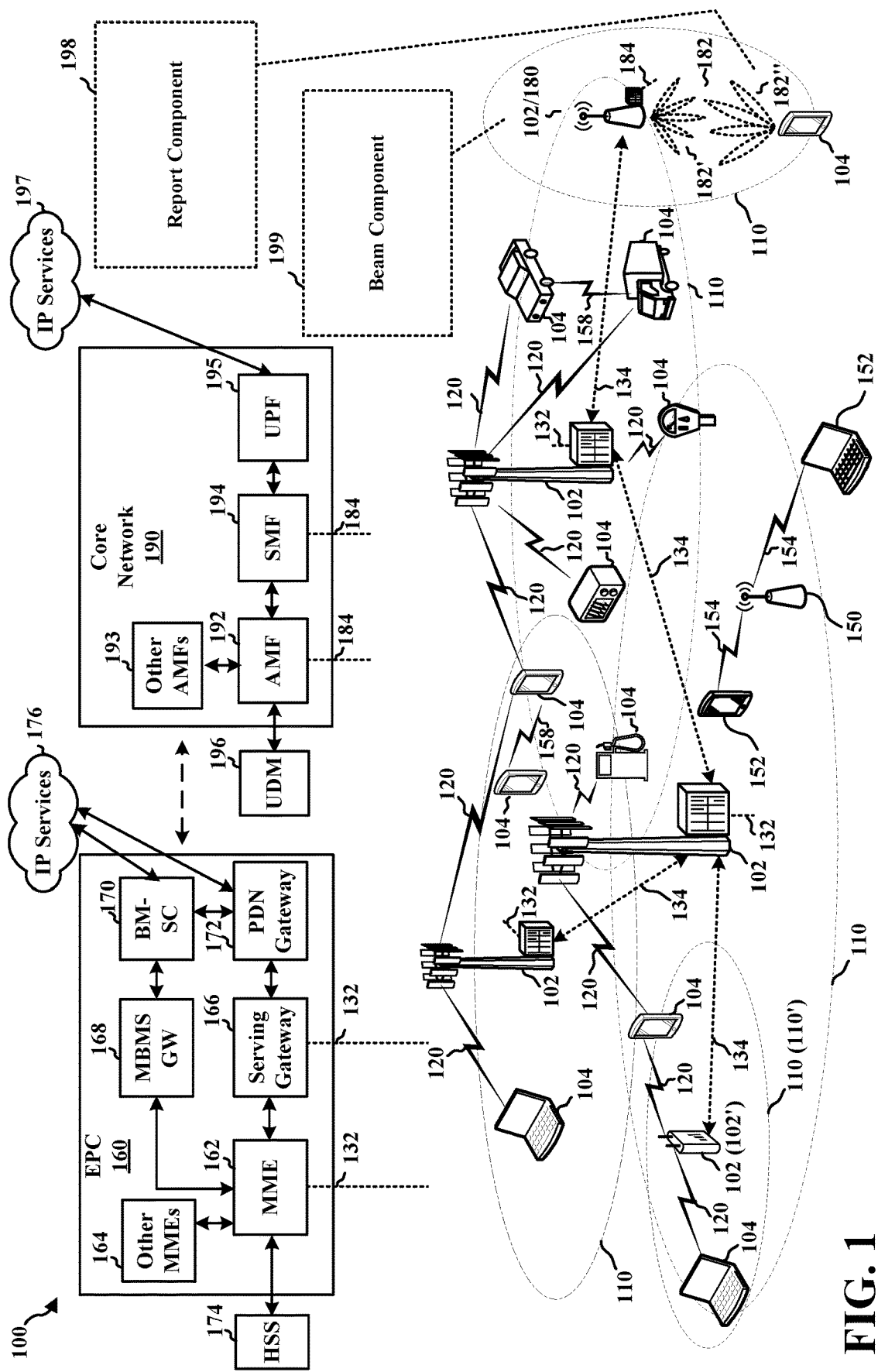
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to provide a beam application time report indicating the time for the application of a beam at a panel of the UE to be utilized for communication with a base station. For example, the UE 104 may include a report component 198 configured to transmit, to the base station 180, the beam application time report indicating the time for the application of a beam at a panel of the UE to be utilized for communication with a base station. The UE 104 may transmit, to the base station 180, a beam application time report for at least one antenna panel of the UE, wherein the beam application time report comprises a time for application of a beam for use by the at least one antenna panel. The UE 104 may apply the beam at the at least one antenna panel of the UE 104 based on the beam application time report in preparation of communication with the base station 180. The UE 104 may communicate with the base station 180 using the beam of the at least one antenna panel at least at a time based on the beam application time report.

Referring again to FIG. 1, in certain aspects, the base station 180 may be configured to configure a beam for communication with the UE 104 in response to a beam application time report received from the UE 104, where the beam application time report indicates a time for the application of a beam at a panel of the UE 104 to be utilized for communication with the base station. For example, the base station 180 may comprise a beam component 199 configured to configure a beam for communication with the UE 104 in response to a beam application time report received from the UE 104, where the beam application time report indicates a time for the application of a beam at a panel of the UE 104 to be utilized for communication with the base station. The base station 180 may receive, from the UE 104, a beam application time report for at least one antenna panel of the UE 104, wherein the beam application time report comprises a time for application of a beam for use by the at least one antenna panel. The base station 180 may apply a beam at an antenna array of the base station 180 based on the beam application time report in preparation of communication with the UE 104. The base station 180 may communicate with the UE 104 using the beam of the antenna array of the base station at least at a time based on the beam application time report.

Although the following description may be focused on 5G NR, the concepts described herein may be applicable to other similar areas, such as LTE, LTE-A, CDMA, GSM, and other wireless technologies.

Figure 2:
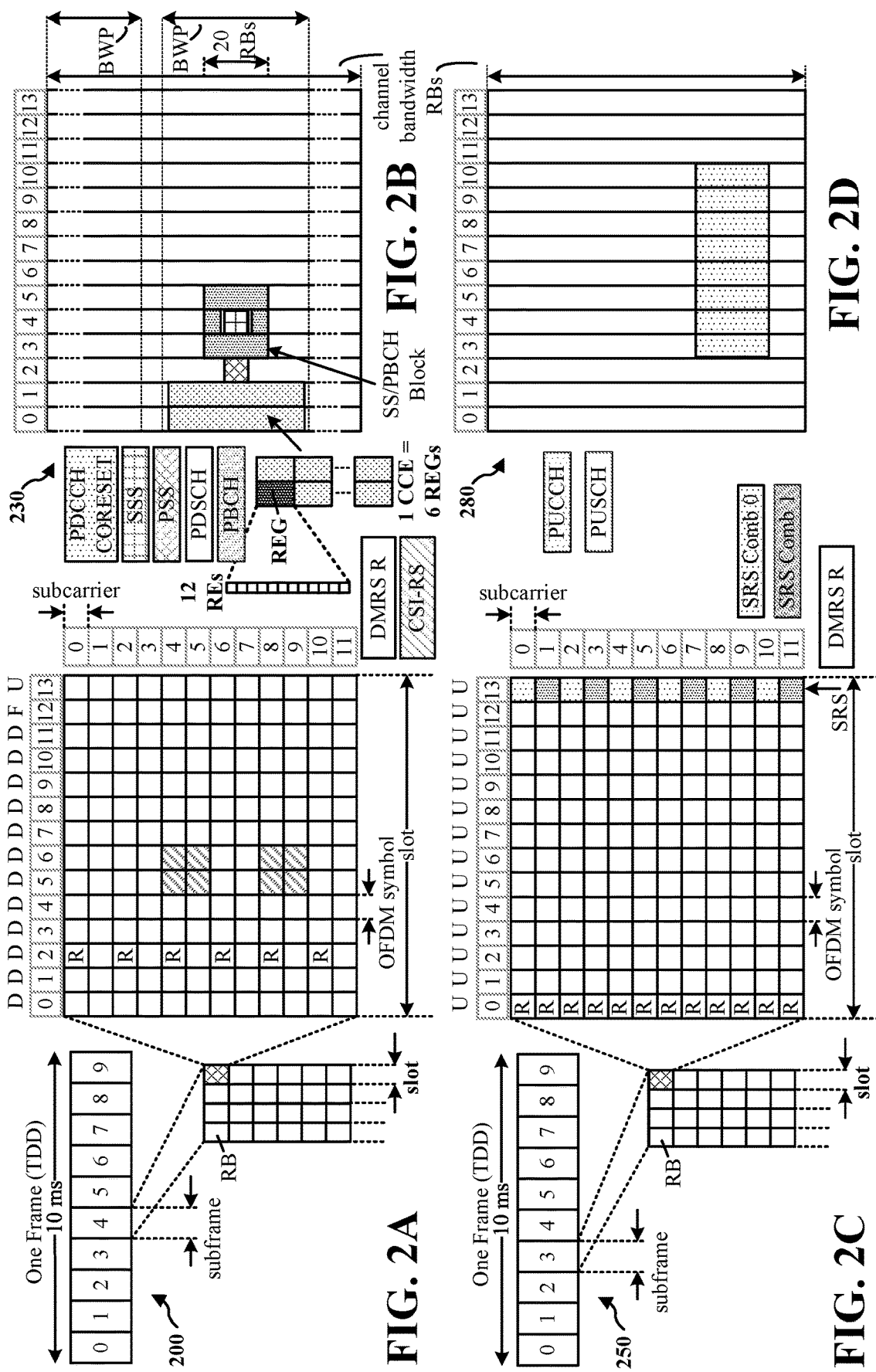
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
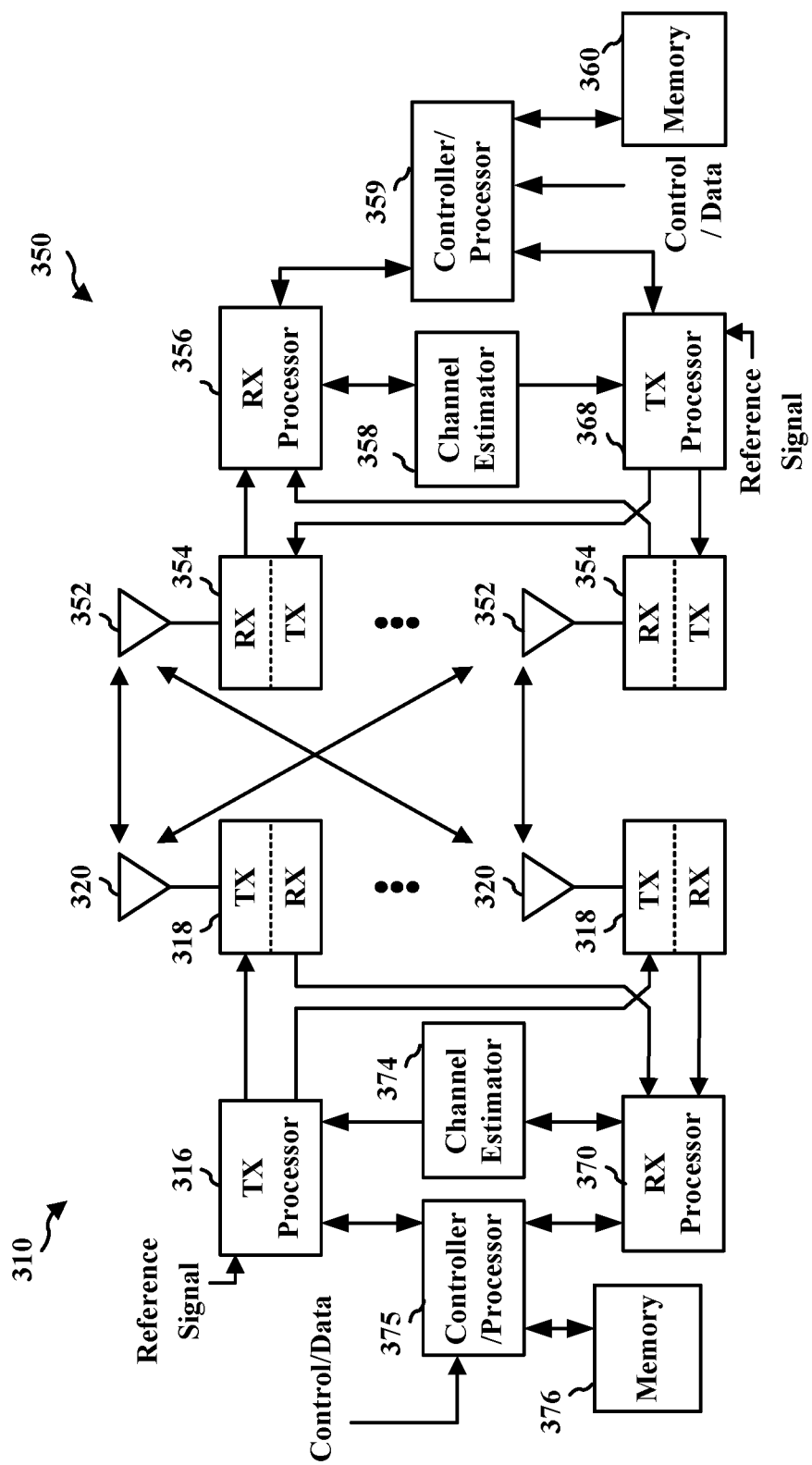
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In wireless communication systems (e.g., including 5G NR wireless communication systems and other wireless communication systems), fast antenna panel selection of the UE may be challenging. A UE antenna panel may comprise a collection of transceiver units (TXRUs) that are able to generate an analog beam. In some instances, the analog beam may correspond to two antenna ports if a dual-polarized array is used. UE antenna panels may constitute the same or different number of antenna ports, number of beams, or effective isotropic radiated power (EIRP), while beam correspondence across different UE antenna panels is not present. In some instances, each UE antenna panel may be comprised of an independent unit of UL transmit power, power control (PC) parameters, fast Fourier transform (FFT) timing window, and/or timing advance (TA). In some instances, the same or different sets of UE antenna panels may be used for downlink reception and uplink transmission, respectively.

DCI based beam indication may be utilized to improve antenna panel selection at the UE and reduce impact of beam switching delay on performance. The beam indication may include an application time of the beam indication. In some instances, if a beam indication is received by the UE, the time for the UE to apply the beam may correspond to the first slot that is at least X ms or Y symbols after the receipt of the DCI based beam indication with the joint or separate downlink/uplink beam indication. In some instances, if a beam indication is received by the UE, the time for the UE to apply the beam may correspond to the first slot that is at least X ms or Y symbols after the acknowledgement of the joint or separate downlink/uplink beam indication. In some instances, X≥1 ms, and Y may comprise 2 slots. However, the disclosure is not intended to be limited to the examples of X and Y presented herein, for example, X may be greater than or less than 1 ms, or Y may be greater than or less than 2 slots. The beam application time or the time for the UE to apply the beam for use for communication may be configured by the network (e.g., base station) based on a UE capability. In such instances, the UE may send the UE capability to a base station. The UE capability may indicate that the UE supports a UE capability for a minimum value of a beam application time. In some instances, the UE capability may indicate one or more of the exact minimum values of beam application time supported by the UE, whether existing UE capability may be reused, whether different beam application time values are supported for uplink and downlink, or whether the UE capability includes a maximum value of a beam application time. In some instances, the beam application time may be fixed and preconfigured, while in some instances, the beam application time may be configured by the network (e.g., base station) where a minimum value of the beam application time is fixed and preconfigured.

Aspects presented herein provide a configuration for providing a beam application time report to the base station to optimize antenna panel selection at the UE. The beam application time report may indicate the time for the application of a beam at a panel of the UE to be utilized for communication with the base station. In some instances, UE antenna panels may be in different sleep or activity modes (e.g., active mode, slight sleep mode, or deep sleep mode), which may result in different beam application time for activation and/or switching. The mode of the UE antenna panel may affect the beam application time. For example, an antenna panel in the active mode or state may comprise instances where the at least one antenna panel is actively communicating with another device (e.g., base station). The deep sleep mode or state may comprise instances where an antenna panel is in a low or reduced power state and not monitoring for incoming transmissions and not transmitting any uplink transmissions. The slight sleep mode or state may comprise instances where an antenna panel is in the low or reduced power state but is monitoring for incoming transmissions on a scheduled or periodic basis but not transmitting any uplink transmissions. Different panels may have different beam switch latencies such that the beam application time report may indicate the associated beam application times based on the switch latencies.

In some instances, the UE may report the beam application time per panel, panel group, or panel saving status (e.g., in different sleep or activity modes). In some instances, the beam application time report may be included in a UE capability signaling. In some instances, the beam application time report may be transmitted based on an occurrence of an event or may be transmitted based on a periodic basis, which may be more dynamic than transmitted the report in the UE capability signaling.

The beam application time may comprise a first report based on DCI based beam indication application time or a second report based on MAC-CE based beam indication application time. A beam application time of the first report or the second report may be the same or different. The beam application time report may include at least one of the first report or the second report.

In some instances, the beam application time may be the same for downlink and uplink. For example, downlink and uplink may use the same panel or may use different panels that have the same or similar beam application time. The UE uplink antenna panels may be the same or a subset of the downlink antenna panels. In some instances, the beam application times may be different for downlink and uplink. for example, downlink and uplink may use different panels which may have different beam application times. In some instances, the UE may report whether the UE supports different beam application times for downlink and uplink.

Figure 4:
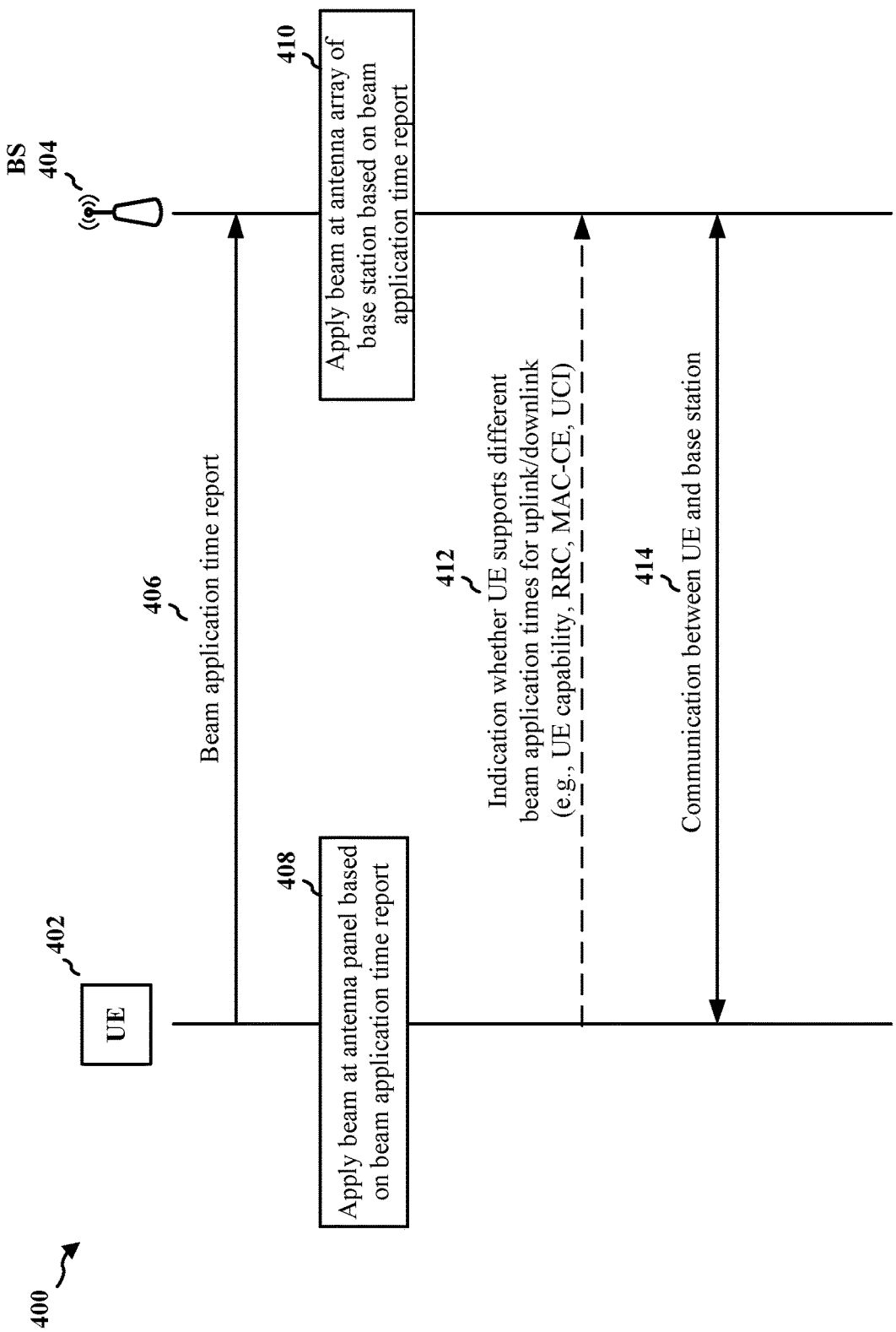
FIG. 4 is a call flow diagram of signaling between a UE and a base station in accordance with certain aspects of the disclosure.

FIG. 4 is a call flow diagram 400 of signaling between a UE 402 and a base station 404. The base station 404 may be configured to provide at least one cell. The UE 402 may be configured to communicate with the base station 404. For example, in the context of FIG. 1, the base station 404 may correspond to base station 102/180 and, accordingly, the cell may include a geographic coverage area 110 in which communication coverage is provided and/or small cell 102' having a coverage area 110'. Further, a UE 402 may correspond to at least UE 104. In another example, in the context of FIG. 3, the base station 404 may correspond to base station 310 and the UE 402 may correspond to UE 350. Optional aspects are illustrated with a dashed line.

As illustrated at 406, the UE 402 may transmit a beam application time report for at least one antenna panel of the UE 402. The UE 402 may transmit the beam application time report to the base station 404. The base station 404 may receive the beam application time report from the UE 402. The beam application time report may comprise a time for application of a beam for use by the at least one antenna panel. For example, the beam application time report may indicate the time when a particular beam at the at least one antenna panel of the UE may be activated or prepared for use in communications with the base station. In some aspects, the beam application time report may indicate that the time for application of the beam comprises a first slot that is at least X ms or Y symbols after receipt of a joint or separate downlink/uplink beam indication from the base station. In some aspects, the beam application time report may indicate that the time for application of the beam comprises a first slot that is at least X ms or Y symbols after an acknowledgment of a joint or separate downlink/uplink beam indication from the base station. The joint downlink/uplink beam indication may include an indication of at least one downlink beam and one uplink beam as a joint common beam TCI. The separate downlink/uplink beam indication may include an indication for at least one downlink beam separate from an indication for at least one uplink beam as a common downlink or uplink beam TCI. In some aspects, the at least one antenna panel may comprise a plurality of antenna panels configured in a panel group, wherein the beam application time report corresponds to the panel group of the plurality of antenna panels. In some aspects, the plurality of antenna panels may have different switch latencies. As such, the beam application time report may indicate beam application times based on switch latencies of the respective plurality of antenna panels. In some aspects, different panels may have different beam switch latencies such that the beam application time report may indicate the associated beam application times based on the switch latencies. Different panels may have different beam switch latencies due in part to different panels covering different frequency bands. For example, one panel or a first set of panels may cover frequency range (FR) 2, while another panel or a second set of panels may cover FR4. In such instances, the panels may have different beam switching latencies due, in part, to having different hardware configurations. In some aspects, the at least one antenna panel may comprise a single antenna panel, wherein the beam application time report corresponds to the single antenna panel. In some aspects, the beam application time report may be based on a panel power saving status of the at least one antenna panel, wherein the at least one antenna panel is in an active state, a slight sleep state, or a deep sleep state. The active state may comprise instances where the at least one antenna panel is actively communicating with another device (e.g., base station). The deep sleep state may comprise instances where the at least one antenna panel is in a low power state and not monitoring for incoming transmissions and not transmitting any uplink transmissions. The slight sleep state may comprise instances where the at least one antenna panel is in the low power state but is monitoring for incoming transmissions on a scheduled or periodic basis but is not transmitting any uplink transmissions.

In some aspects, the beam application time report may be comprised within a UE capability signal transmitted to the base station. The transmission of the beam application time report within the UE capability signal may occur during a connection establishment procedure with the base station. In some aspects, transmission of the beam application time report may be triggered by an occurrence of an event. The event that may trigger the transmission of the beam application time report comprises at least a panel group change or a panel power saving status change. However, other events may trigger the transmission of the beam application time report and the disclosure is not intended to be limited to the examples presented herein. In some aspects, transmission of the beam application time report may occur periodically, aperiodically, or semi-persistently. In some aspects, the beam application time report may comprise a first report based on downlink control information (DCI) based beam indication application time or a second report based on medium access control (MAC) control element (CE) (MAC-CE) based beam indication application time. A beam application time of the first or second reports may be the same or different. The beam application time report may include at least one of the first or second reports.

As illustrated at 408, the UE 402 may apply the beam at the at least one antenna panel of the UE 402. The UE 402 may apply the beam at the at least one antenna panel of the UE 402 based on the beam application time report in preparation of communication with the base station. The UE 402 may apply the beam at the at least one antenna panel of the UE 402 in response to transmitting the beam application time report to the base station 404. For example, the UE 402 may apply the beam at the at least one antenna panel at a time that corresponds to a first slot that is at least X ms or Y symbols after receipt of a joint or separate downlink/uplink beam indication from the base station. In some aspects, the UE 402 may apply the beam at the at least one antenna panel at a time that corresponds to a first slot that is at least X ms or Y symbols after an acknowledgment of a joint or separate downlink/uplink beam indication from the base station.

As illustrated at 410, the base station 404 may apply a beam at an antenna array of the base station 404 in response to receiving the beam application time report from the UE 402. The base station 404 may apply the beam at the antenna array of the base station 404 based on the beam application time report in preparation of communication with the UE. The base station 404 applying the beam at its antenna array based on the beam application time report may allow for the base station and the UE to be synchronized for the communication between the UE 402 and base station 404. The beam application time report may indicate to the base station 404 the time that one or more beams at the UE 402 may be prepared or activated for use in communication with the base station 404.

In some aspects, for example as illustrated at 412, the UE 402 may indicate whether the UE 402 supports different beam application times for uplink and/or downlink communications. The UE 402 may indicate whether the UE 402 supports different beam application times for uplink and/or downlink communications in a UE capability signaling or another uplink signaling. For example, the UE 402 may indicate whether the UE 402 supports different beam application times for uplink and/or downlink communications in an uplink RRC signaling, MAC-CE, or UCI.

As illustrated at 414, the UE 402 and base station 404 may communicate with each other. The UE 402 and the base station 404 may initiate communications with each other at least at a time based on the beam application time report. For example, the UE 402 communicating with the base station 404 may comprise receiving and/or transmitting a transmission using the beam at the at least one antenna panel of the UE 402 at least at a time indicated in the beam application time report. The beam application time report may indicate when the beam at the at least one antenna panel of the UE 402 is prepared for communication with the base station 404, such that the respective beams of the UE 402 and the base station 404 are synchronized. The receiving or the transmitting the transmission may occur at a same antenna panel or at different antenna panels of the at least one antenna panel of the UE 402. In some aspects, the beam application time report may be the same for downlink and uplink communications of the UE 402. Downlink and uplink communications of the UE 402 may utilize the same or different antenna panels of the UE 402 having the same beam application time. In some aspects, the beam application time report is different for downlink and uplink communications of the UE 402, where downlink and uplink communication of the UE 402 utilize different antenna panels having different beam application times.

Figure 5:
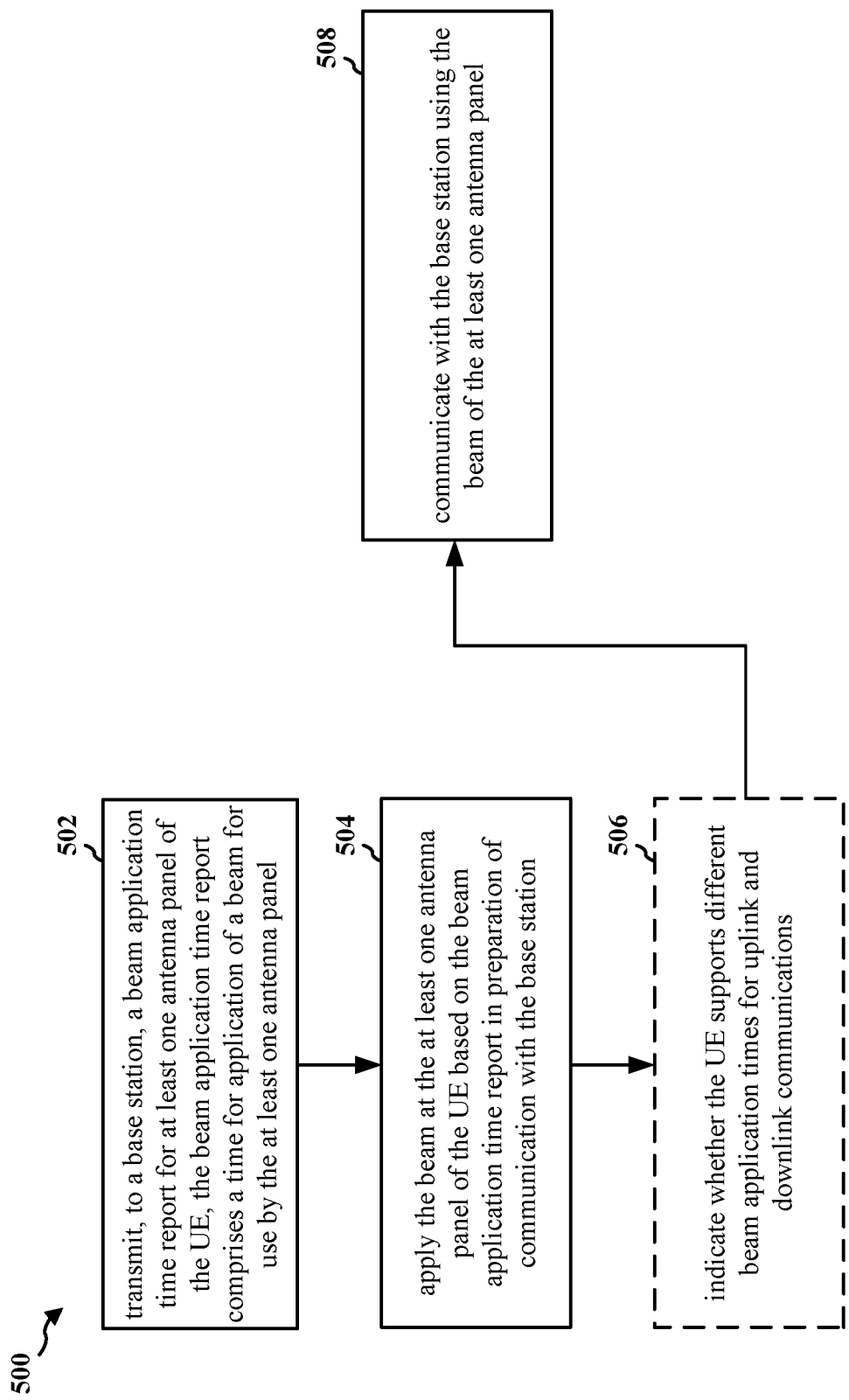
FIG. 5 is a flowchart of a method of wireless communication.

FIG. 5 is a flowchart 500 of a method of wireless communication. The method may be performed by a UE or a component of a UE (e.g., the UE 104, 402; the apparatus 602; the cellular baseband processor 604, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may allow a UE to provide a beam application time report indicating the time for the application of a beam at a panel of the UE to be utilized for communication with a base station.

At 502, the UE may transmit a beam application time report for at least one antenna panel of the UE. For example, 502 may be performed by report component 640 of apparatus 602. The UE may transmit the beam application time report to the base station. The beam application time report may comprise a time for application of a beam for use by the at least one antenna panel. For example, the beam application time report may indicate the time when a particular beam at the at least one antenna panel of the UE may be activated or prepared for use in communications with the base station. In some aspects, the beam application time report may indicate that the time for application of the beam comprises a first slot that is at least X ms or Y symbols after receipt of a joint or separate downlink/uplink beam indication from the base station. In some aspects, the beam application time report may indicate that the time for application of the beam comprises a first slot that is at least X ms or Y symbols after an acknowledgment of a joint or separate downlink/uplink beam indication from the base station. The joint downlink/uplink beam indication may include an indication of at least one downlink beam and one uplink beam as a joint common beam TCI. The separate downlink/uplink beam indication may include an indication for at least one downlink beam separate from an indication for at least one uplink beam as a common downlink or uplink beam TCI. In some aspects, the at least one antenna panel may comprise a plurality of antenna panels configured in a panel group, wherein the beam application time report corresponds to the panel group of the plurality of antenna panels. In some aspects, the plurality of antenna panels may have different switch latencies. As such, the beam application time report may indicate beam application times based on switch latencies of the respective plurality of antenna panels. In some aspects, different panels may have different beam switch latencies such that the beam application time report may indicate the associated beam application times based on the switch latencies. Different panels may have different beam switch latencies due in part to different panels covering different frequency bands. For example, one panel or a first set of panels may cover FR2, while another panel or a second set of panels may cover FR4. In such instances, the panels may have different beam switching latencies due, in part, to having different hardware configurations. In some aspects, the at least one antenna panel may comprise a single antenna panel, wherein the beam application time report corresponds to the single antenna panel. In some aspects, the beam application time report may be based on a panel power saving status of the at least one antenna panel, wherein the at least one antenna panel is in an active state, a slight sleep state, or a deep sleep state. The active state may comprise instances where the at least one antenna panel is actively communicating with another device (e.g., base station). The deep sleep state may comprise instances where the at least one antenna panel is in a low power state and not monitoring for incoming transmissions and not transmitting any uplink transmissions. The slight sleep state may comprise instances where the at least one antenna panel is in the low power state but is monitoring for incoming transmissions on a scheduled or periodic basis but is not transmitting any uplink transmissions.

In some aspects, the beam application time report may be comprised within a UE capability signal transmitted to the base station. The transmission of the beam application time report within the UE capability signal may occur during a connection establishment procedure with the base station. In some aspects, transmission of the beam application time report may be triggered by an occurrence of an event. The event that may trigger the transmission of the beam application time report comprises at least a panel group change or a panel power saving status change. However, other events may trigger the transmission of the beam application time report and the disclosure is not intended to be limited the examples presented herein. In some aspects, transmission of the beam application time report may occur periodically, aperiodically, or semi-persistently. In some aspects, the beam application time report may comprise a first report based on DCI based beam indication application time or a second report based on MAC-CE based beam indication application time. A beam application time of the first or second reports may be the same or different. The beam application time report may include at least one of the first or second reports.

At 504, the UE may apply the beam at the at least one antenna panel of the UE. For example, 504 may be performed by beam component 642 of apparatus 602. The UE may apply the beam at the at least one antenna panel of the UE based on the beam application time report in preparation of communication with the base station.

In some aspects, for example at 506, the UE may indicate whether the UE supports different beam application times for uplink and/or downlink communications. For example, 506 may be performed by indication component 644 of apparatus 602. The UE may indicate whether the UE supports different beam application times for uplink and/or downlink communications in a UE capability signaling or another uplink signaling. For example, the UE may indicate whether the UE supports different beam application times for uplink and/or downlink communications in an uplink RRC signaling, MAC-CE, or UCI.

At 508, the UE may communicate with the base station using the beam of the at least one antenna panel. For example, 508 may be performed by communication component 646 of apparatus 602. The UE may communicate with the base station using the beam of the at least one antenna panel at a time based on the beam application time report. The communicating with the base station further comprises receiving or transmitting a transmission using the beam at the at least one antenna panel at least at a time indicated in the beam application time report. The beam application time report may indicate when the beam at the at least one antenna panel of the UE is prepared for communication with the base station, such that respective beams of the UE and the base station are synchronized. The receiving or the transmitting the transmission may occur at a same antenna panel or at different antenna panels of the at least one antenna panel. In some aspects, the beam application time report may be the same for downlink and uplink communications of the UE. Downlink and uplink communications of the UE may utilize the same or different antenna panels of the UE having the same beam application time. In some aspects, the beam application time report is different for downlink and uplink communications of the UE, wherein downlink and uplink communication of the UE utilize different antenna panels having different beam application times.

Figure 6:
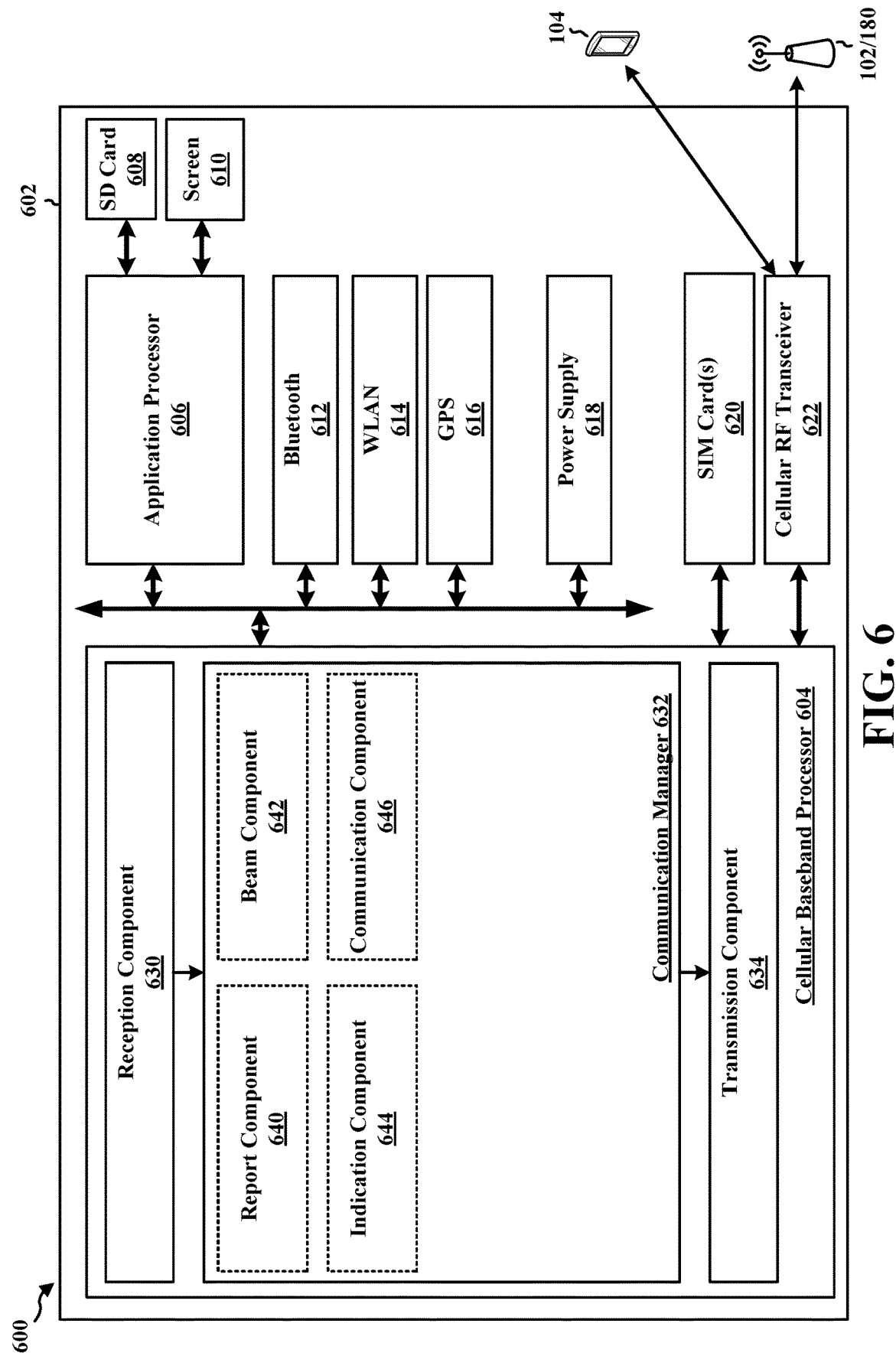
FIG. 6 is a diagram illustrating an example of a hardware implementation for an example apparatus.

FIG. 6 is a diagram 600 illustrating an example of a hardware implementation for an apparatus 602. The apparatus 602 is a UE and includes a cellular baseband processor 604 (also referred to as a modem) coupled to a cellular RF transceiver 622 and one or more subscriber identity modules (SIM) cards 620, an application processor 606 coupled to a secure digital (SD) card 608 and a screen 610, a Bluetooth module 612, a wireless local area network (WLAN) module 614, a Global Positioning System (GPS) module 616, and a power supply 618. The cellular baseband processor 604 communicates through the cellular RF transceiver 622 with the UE 104 and/or BS 102/180. The cellular baseband processor 604 may include a computer-readable medium/ memory. The computer-readable medium/memory may be non-transitory. The cellular baseband processor 604 is responsible for general processing, including the execution of software stored on the computer-readable medium/ memory. The software, when executed by the cellular baseband processor 604, causes the cellular baseband processor 604 to perform the various functions described supra. The computer-readable medium/memory may also be used for storing data that is manipulated by the cellular baseband processor 604 when executing software. The cellular baseband processor 604 further includes a reception component 630, a communication manager 632, and a transmission component 634. The communication manager 632 includes the one or more illustrated components. The components within the communication manager 632 may be stored in the computer-readable medium/memory and/or configured as hardware within the cellular baseband processor 604. The cellular baseband processor 604 may be a component of the UE 350 and may include the memory 360 and/or at least one of the TX processor 368, the RX processor 356, and the controller/processor 359. In one configuration, the apparatus 602 may be a modem chip and include just the cellular baseband processor 604, and in another configuration, the apparatus 602 may be the entire UE (e.g., see 350 of FIG. 3) and include the aforediscussed additional modules of the apparatus 602.

The communication manager 632 includes a report component 640 that is configured to may transmit a beam application time report for at least one antenna panel of the UE, e.g., as described in connection with 502 of FIG. 5. The communication manager 632 further includes a beam component 642 that is configured to apply the beam at the at least one antenna panel of the UE, e.g., as described in connection with 504 of FIG. 5. The communication manager 632 further includes an indication component 644 that is configured to indicate whether the UE supports different beam application times for uplink and/or downlink communications, e.g., as described in connection with 506 of FIG. 5. The communication manager 632 further includes a communication component 646 that is configured to communicate with the base station using the beam of the at least one antenna panel, e.g., as described in connection with 508 of FIG. 5.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 602, and in particular the cellular baseband processor 604, includes means for transmitting, to a base station, a beam application time report for at least one antenna panel of the UE. The beam application time report comprises a time for application of a beam for use by the at least one antenna panel. The apparatus includes means for applying the beam at the at least one antenna panel of the UE based on the beam application time report in preparation of communication with the base station. The apparatus includes means for communicating with the base station using the beam of the at least one antenna panel. The apparatus further includes means for receiving or transmitting a transmission using the beam at the at least one antenna panel. The apparatus further includes means for indicating whether the UE supports different beam application times for uplink and downlink communications in a UE capability signaling or another uplink signaling. The aforementioned means may be one or more of the aforementioned components of the apparatus 602 configured to perform the functions recited by the aforementioned means. As described supra, the apparatus 602 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 7:
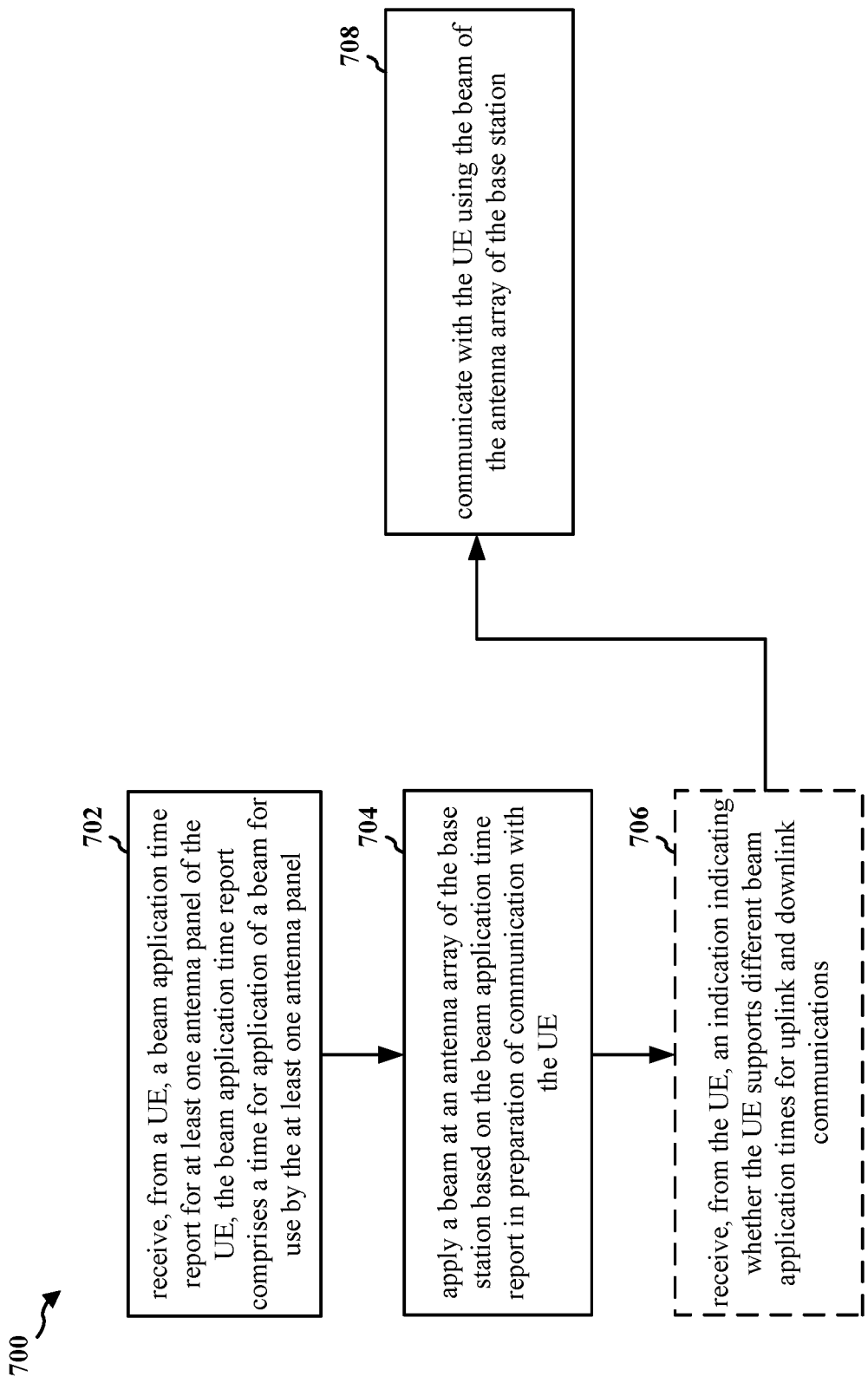
FIG. 7 is a flowchart of a method of wireless communication.

FIG. 7 is a flowchart 700 of a method of wireless communication. The method may be performed by a base station or a component of a base station (e.g., the base station 102/180, 404; the apparatus 802; the baseband unit 804, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to configure a beam for communication with the UE in response to a beam application time report received from the UE, where the beam application time report indicates a time for the application of a beam at a panel of the UE to be utilized for communication with the base station.

At 702, the base station may receive a beam application time report for at least one antenna panel of the UE. For example, 702 may be performed by report component 840 of apparatus 802. The base station may receive the beam application time report from the UE. The beam application time report may comprise a time for application of a beam at the UE for use by the at least one antenna panel of the UE. For example, the beam application time report may indicate the time when a particular beam at the at least one antenna panel of the UE may be activated or prepared for use in communications with the base station. In some aspects, the beam application time report may indicate that the time for application of the beam of the at least one antenna panel of the UE comprises a first slot that is at least X ms or Y symbols after receipt, by the UE, of a joint or separate downlink/uplink beam indication. In some aspects, the beam application time report indicates that the time for application of the beam of the at least one antenna panel of the UE comprises a first slot that is at least X ms or Y symbols after an acknowledgment, from the UE, of a joint or separate downlink/uplink beam indication. The joint downlink/uplink beam indication may include an indication of a downlink beam and an uplink beam as a joint TCI. The separate downlink/uplink beam indication may include an indication for a downlink beam separate from an indication for an uplink beam. In some aspects, the at least one antenna panel of the UE may comprise a plurality of antenna panels configured in a panel group, wherein the beam application time report corresponds to the panel group of the plurality of antenna panels of the UE. In some aspects, the plurality of antenna panels of the UE may have different switch latencies. As such, the beam application time report may indicate beam application times based on switch latencies of the respective plurality of antenna panels of the UE. In some aspects, different panels may have different beam switch latencies such that the beam application time report may indicate the associated beam application times based on the switch latencies. Different panels may have different beam switch latencies due in part to different panels covering different frequency bands. For example, one panel or a first set of panels may cover frequency range (FR) 2, while another panel or a second set of panels may cover FR4. In such instances, the panels may have different beam switching latencies due, in part, to having different hardware configurations. In some aspects, the at least one antenna panel of the UE may comprise a single antenna panel, wherein the beam application time report corresponds to the single antenna panel. the beam application time report is based on a panel power saving status of the at least one antenna panel of the UE, wherein the at least one antenna panel is in an active state, a slight sleep state, or a deep sleep state. The active state may comprise instances where the at least one antenna panel is actively communicating with another device (e.g., base station). The deep sleep state may comprise instances where the at least one antenna panel is in a low power state and not monitoring for incoming transmissions and/or not transmitting any uplink transmissions. The slight sleep state may comprise instances where the at least one antenna panel is in the low power state but is monitoring for incoming transmissions on a scheduled or periodic basis.

In some aspects, the beam application time report may be comprised within a UE capability signal transmitted by the UE to the base station. The transmission of the beam application time report within the UE capability signal may occur during a connection establishment procedure with the base station. In some aspects, transmission of the beam application time report by the UE may be triggered by an occurrence of an event. For example, an event that may trigger the transmission of the beam application time report comprises at least a panel group change or a panel power saving status change. However, other events may trigger the transmission of the beam application time report and the disclosure is not intended to be limited the examples presented herein. In some aspects, transmission of the beam application time report by the UE may occur periodically, aperiodically, or semi-persistently. In some aspects, the beam application time report may comprise a first report based on DCI based beam indication application time or a second report based on MAC-CE based beam indication application time. A beam application time of the first or second reports may be the same or different. The beam application time report may include at least one of the first or second reports.

At 704, the base station may apply a beam at an antenna array of the base station. For example, 704 may be performed by beam component 842 of apparatus 802. The base station may apply the beam at the antenna array of the base station based on the beam application time report in preparation of communication with the UE.

In some aspects, for example at 706, the base station may receive an indication indicating whether the UE supports different beam application times for uplink and/or downlink communications. For example, 706 may be performed by indication component 844 of apparatus 802. The base station may receive the indication from the UE. The base station may receive the indication indicating whether the UE supports different beam application times for uplink and/or downlink communications in a UE capability signaling or another uplink signaling. For example, the base station may receive the indication from the UE indicating whether the UE supports different beam application times for uplink and/or downlink communications in an uplink RRC signaling, MAC-CE, or UCI.

At 708, the base station may communicate with the UE using the beam of the antenna array of the base station. For example, 708 may be performed by communication component 846 of the apparatus 802. The base station may communicate with the UE at a time based on the beam application time report. The communicating with the UE further comprises receiving or transmitting a transmission via the beam at the at least one antenna panel of the UE at least at a time indicated in the beam application time report. The beam application time report may indicate when the beam at the at least one antenna panel of the UE is prepared for communication with the base station, such that respective beams of the UE and the base station are synchronized. The receiving or the transmitting the transmission may occur at a same antenna panel or at different antenna panels of the at least one antenna panel of the UE. In some aspects, the beam application time report may be the same for downlink and uplink communications of the UE. Downlink and uplink communications of the UE may utilize the same or different antenna panels of the UE having the same beam application time. In some aspects, the beam application time report is different for downlink and uplink communications of the UE, wherein downlink and uplink communication of the UE utilize different antenna panels having different beam application times.

Figure 8:
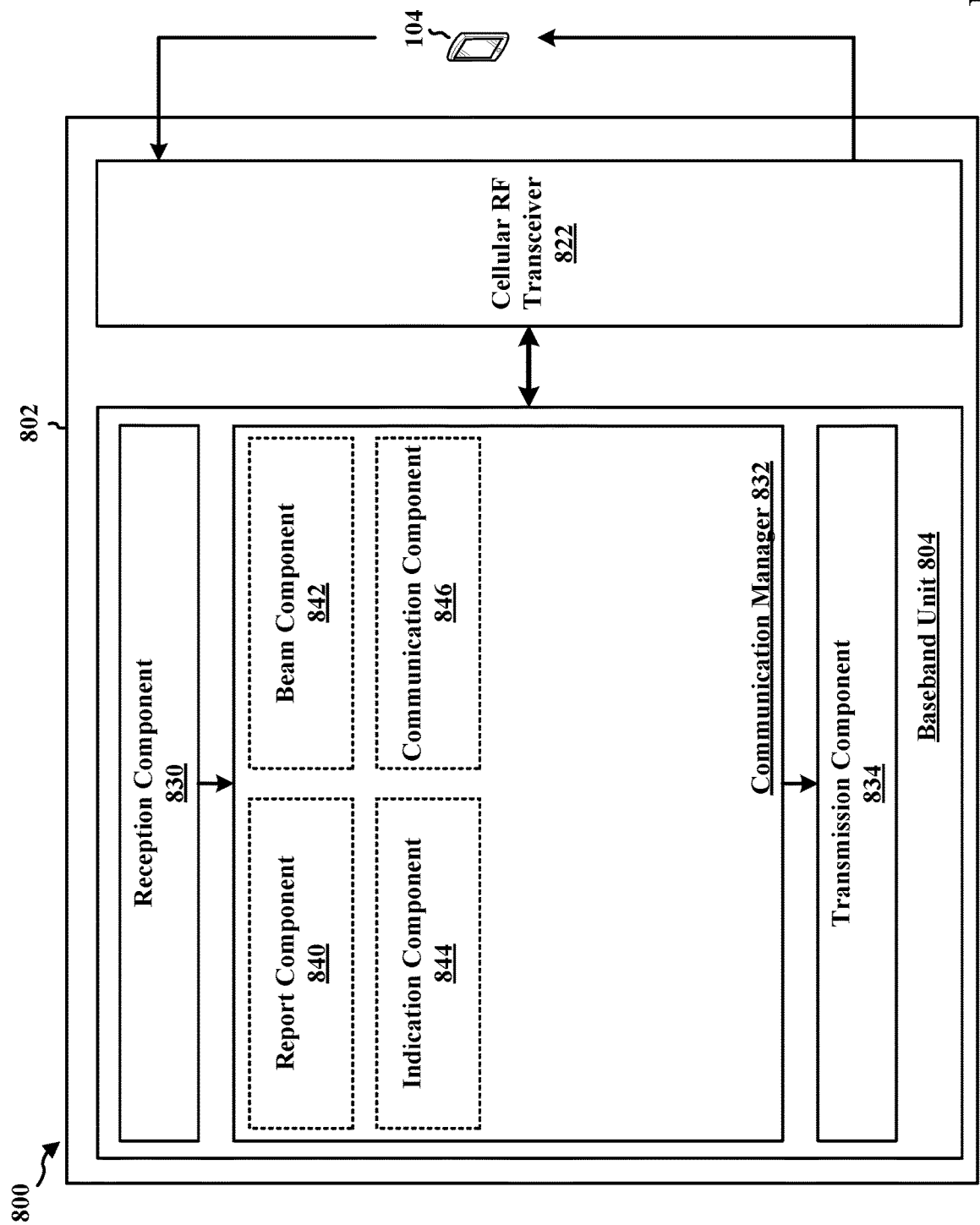
FIG. 8 is a diagram illustrating an example of a hardware implementation for an example apparatus.

FIG. 8 is a diagram 800 illustrating an example of a hardware implementation for an apparatus 802. The apparatus 802 is a BS and includes a baseband unit 804. The baseband unit 804 may communicate through a cellular RF transceiver 822 with the UE 104. The baseband unit 804 may include a computer-readable medium/memory. The baseband unit 804 is responsible for general processing, including the execution of software stored on the computer-readable medium/memory. The software, when executed by the baseband unit 804, causes the baseband unit 804 to perform the various functions described supra. The computer-readable medium/memory may also be used for storing data that is manipulated by the baseband unit 804 when executing software. The baseband unit 804 further includes a reception component 830, a communication manager 832, and a transmission component 834. The communication manager 832 includes the one or more illustrated components. The components within the communication manager 832 may be stored in the computer-readable medium/ memory and/or configured as hardware within the baseband unit 804. The baseband unit 804 may be a component of the BS 310 and may include the memory 376 and/or at least one of the TX processor 316, the RX processor 370, and the controller/processor 375.

The communication manager 832 includes a report component 840 that receives a beam application time report for at least one antenna panel of the UE, e.g., as described in connection with 702 of FIG. 7. The communication manager 832 further includes a beam component 842 that may apply a beam at an antenna array of the base station, e.g., as described in connection with 704 of FIG. 7. The communication manager 832 further includes an indication component 844 that may receive an indication indicating whether the UE supports different beam application times for uplink and/or downlink communications, e.g., as described in connection with 706 of FIG. 7. The communication manager 832 further includes a communication component 846 that may communicate with the UE using the beam of the antenna array of the base station, e.g., as described in connection with 708 of FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the baseband unit 804, includes means for receiving, from a UE, a beam application time report for at least one antenna panel of the UE. The beam application time report comprises a time for application of a beam for use by the at least one antenna panel. The apparatus include s means for applying a beam at an antenna array of the base station based on the beam application time report in preparation of communication with the UE. The apparatus includes means for communicating with the UE using the beam of the antenna array of the base station. The apparatus further includes means for receiving, from the UE, an indication indicating whether the UE supports different beam application times for uplink and downlink communications in a UE capability signaling or another uplink signaling. The aforementioned means may be one or more of the aforementioned components of the apparatus 802 configured to perform the functions recited by the aforementioned means. As described supra, the apparatus 802 may include the TX Processor 316, the RX Processor 370, and the controller/processor 375. As such, in one configuration, the aforementioned means may be the TX Processor 316, the RX Processor 370, and the controller/ processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Aspect 1 is a method of wireless communication of a UE comprising transmitting, to a base station, a beam application time report for at least one antenna panel of the UE, wherein the beam application time report comprises a time for application of a beam for use by the at least one antenna panel; applying the beam at the at least one antenna panel of the UE based on the beam application time report in preparation of communication with the base station; and communicating with the base station using the beam of the at least one antenna panel.

In Aspect 2, the method of Aspect 1 further includes that the beam application time report indicates that the time for application of the beam comprises a first slot that is at least X ms or Y symbols after receipt of a joint or separate downlink/uplink beam indication from the base station.

In Aspect 3, the method of Aspect 1 or 2 further includes that the beam application time report indicates that the time for application of the beam comprises a first slot that is at least X ms or Y symbols after an acknowledgment of a joint or separate downlink/uplink beam indication from the base station.

In Aspect 4, the method of any of Aspects 1-3 further includes that the at least one antenna panel comprises a plurality of antenna panels configured in a panel group, wherein the beam application time report corresponds to the panel group of the plurality of antenna panels.

In Aspect 5, the method of any of Aspects 1-4 further includes that the plurality of antenna panels have different switch latencies, wherein the beam application time report indicates beam application times based on switch latencies of the respective plurality of antenna panels.

In Aspect 6, the method of any of Aspects 1-5 further includes that the beam application time report is based on a panel power saving status of the at least one antenna panel, wherein the at least one antenna panel is in an active state, a slight sleep state, or a deep sleep state.

In Aspect 7, the method of any of Aspects 1-6 further includes that the beam application time report is comprised within a UE capability signal transmitted to the base station, wherein transmission of the beam application time report within the UE capability signal occurs during a connection establishment procedure with the base station.

In Aspect 8, the method of any of Aspects 1-7 further includes that transmission of the beam application time report is triggered by an occurrence of an event, wherein the event that triggers the transmission of the beam application time report comprises at least a panel group change or a panel power saving status change.

In Aspect 9, the method of any of Aspects 1-8 further includes that transmission of the beam application time report occurs periodically, aperiodically, or semi-persistently.

In Aspect 10, the method of any of Aspects 1-9 further includes that the beam application time report comprises a first report based on DCI based beam indication application time or a second report based on MAC-CE based beam indication application time.

In Aspect 11, the method of any of Aspects 1-10 further includes that a beam application time of the first or second reports is the same or different, wherein the beam application time report includes at least one of the first or second reports.

In Aspect 12, the method of any of Aspects 1-11 further includes that the communicating with the base station further includes receiving or transmitting a transmission using the beam at the at least one antenna panel.

In Aspect 13, the method of any of Aspects 1-12 further includes that the receiving or the transmitting the transmission occurs at a same antenna panel or at different antenna panels of the at least one antenna panel.

In Aspect 14, the method of any of Aspects 1-13 further includes that the beam application time report is the same for downlink and uplink communications of the UE, wherein downlink and uplink communications of the UE utilize the same or different antenna panels of the UE having the same beam application time.

In Aspect 15, the method of any of Aspects 1-14 further includes that the beam application time report is different for downlink and uplink communications of the UE, wherein downlink and uplink communication of the UE utilize different antenna panels having different beam application times.

In Aspect 16, the method of any of Aspects 1-15 further includes indicating whether the UE supports different beam application times for uplink and downlink communications in a UE capability signaling or another uplink signaling.

Aspect 17 is a device including one or more processors and one or more memories in electronic communication with the one or more processors storing instructions executable by the one or more processors to cause the system or apparatus to implement a method as in any of Aspects 1-16.

Aspect 18 is a system or apparatus including means for implementing a method or realizing an apparatus as in any of Aspects 1-16.

Aspect 19 is a non-transitory computer readable medium storing instructions executable by one or more processors to cause the one or more processors to implement a method as in any of Aspects 1-16.

Aspect 20 is a method of wireless communication of a base station comprising receiving, from a UE, a beam application time report for at least one antenna panel of the UE, wherein the beam application time report comprises a time for application of a beam for use by the at least one antenna panel; applying a beam at an antenna array of the base station based on the beam application time report in preparation of communication with the UE; and communicating with the UE using the beam of the antenna array of the base station at least at a time based on the beam application time report.

In Aspect 21, the method of Aspect 20 further includes that the beam application time report indicates that the time for application of the beam of the at least one antenna panel of the UE comprises a first slot that is at least X ms or Y symbols after receipt, by the UE, of a joint or separate downlink/uplink beam indication.

In Aspect 22, the method of Aspect 20 or 21 further includes that the beam application time report indicates that the time for application of the beam of the at least one antenna panel of the UE comprises a first slot that is at least X ms or Y symbols after an acknowledgment, from the UE, of a joint or separate downlink/uplink beam indication.

In Aspect 23, the method of any of Aspects 20-22 further includes that the at least one antenna panel of the UE comprises a plurality of antenna panels configured in a panel group, wherein the beam application time report corresponds to the panel group of the plurality of antenna panels of the UE.

In Aspect 24, the method of any of Aspects 20-23 further includes that the plurality of antenna panels of the UE have different switch latencies, wherein the beam application time report indicates beam application times based on switch latencies of the respective plurality of antenna panels of the UE.

In Aspect 25, the method of any of Aspects 20-24 further includes that the beam application time report is based on a panel power saving status of the at least one antenna panel of the UE, wherein the at least one antenna panel is in an active state, a slight sleep state, or a deep sleep state.

In Aspect 26, the method of any of Aspects 20-25 further includes that the beam application time report is comprised within a UE capability signal transmitted by the UE, wherein transmission of the beam application time report within the UE capability signal occurs during a connection establishment procedure between the base station and the UE.

In Aspect 27, the method of any of Aspects 20-26 further includes that transmission of the beam application time report by the UE is triggered by an occurrence of an event, wherein the event that triggers the transmission of the beam application time report comprises at least a panel group change at the UE or a panel power saving status change at the UE.

In Aspect 28, the method of any of Aspects 20-27 further includes that transmission of the beam application time report by the UE occurs periodically, aperiodically, or semi-persistently.

In Aspect 29, the method of any of Aspects 20-28 further includes that the beam application time report comprises a first report based on DCI based beam indication application time or a second report based on MAC-CE based beam indication application time.

In Aspect 30, the method of any of Aspects 20-29 further includes that a beam application time of the first or second reports is the same or different, wherein the beam application time report includes at least one of the first or second reports.

In Aspect 31, the method of any of Aspects 20-30 further includes receiving, from the UE, an indication indicating whether the UE supports different beam application times for uplink and downlink communications in a UE capability signaling or another uplink signaling.

Aspect 32 is a device including one or more processors and one or more memories in electronic communication with the one or more processors storing instructions executable by the one or more processors to cause the system or apparatus to implement a method as in any of Aspects 20-31.

Aspect 33 is a system or apparatus including means for implementing a method or realizing an apparatus as in any of Aspects 20-31.

Aspect 34 is a non-transitory computer readable medium storing instructions executable by one or more processors to cause the one or more processors to implement a method as in any of Aspects 20-31.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a user equipment (UE), comprising:
    a memory; and
    at least one processor coupled to the memory and configured to:
        transmit, to a base station, a beam application time report for at least one antenna panel of the UE, wherein the beam application time report comprises a time for application of a beam for use by the at least one antenna panel;
        apply the beam at the at least one antenna panel of the UE based on the beam application time report in preparation of communication with the base station; and
        communicate with the base station using the beam of the at least one antenna panel at least at a time based on the beam application time report.

2. The apparatus of claim 1, wherein the beam application time report indicates that the time for application of the beam comprises a first slot that is at least X ms or Y symbols after receipt of a joint or separate downlink/uplink beam indication from the base station.

3. The apparatus of claim 1, wherein the beam application time report indicates that the time for application of the beam comprises a first slot that is at least X ms or Y symbols after an acknowledgment of a joint or separate downlink/uplink beam indication from the base station.

4. The apparatus of claim 1, wherein the at least one antenna panel comprises a plurality of antenna panels configured in a panel group, wherein the beam application time report corresponds to the panel group of the plurality of antenna panels.

5. The apparatus of claim 4, wherein the plurality of antenna panels have different switch latencies, wherein the beam application time report indicates beam application times based on switch latencies of respective plurality of antenna panels.

6. The apparatus of claim 1, wherein the beam application time report is based on a panel power saving status of the at least one antenna panel, wherein the at least one antenna panel is in an active state, a slight sleep state, or a deep sleep state.

7. The apparatus of claim 1, wherein the beam application time report is comprised within a UE capability signal transmitted to the base station, wherein transmission of the beam application time report within the UE capability signal occurs during a connection establishment procedure with the base station.

8. The apparatus of claim 1, wherein transmission of the beam application time report is triggered by an occurrence of an event, wherein the event that triggers the transmission of the beam application time report comprises at least a panel group change or a panel power saving status change.

9. The apparatus of claim 1, wherein transmission of the beam application time report occurs periodically, aperiodically, or semi-persistently.

10. The apparatus of claim 1, wherein the beam application time report comprises a first report based on downlink control information (DCI) based beam indication application time or a second report based on medium access control (MAC) control element (CE) (MAC-CE) based beam indication application time.

11. The apparatus of claim 10, wherein a beam application time of the first report or the second report is same or different, wherein the beam application time report includes at least one of the first report or the second report.

12. The apparatus of claim 1, wherein to communicate with the base station the at least one processor is configured to:
receive or transmit a transmission using the beam at the at least one antenna panel.

13. The apparatus of claim 12, wherein receiving or transmitting the transmission occurs at a same antenna panel or at different antenna panels of the at least one antenna panel.

14. The apparatus of claim 12, wherein the beam application time report is same for downlink and uplink communications of the UE, wherein the downlink and uplink communications of the UE utilize same or different antenna panels of the UE having a same beam application time.

15. The apparatus of claim 12, wherein the beam application time report is different for downlink and uplink communications of the UE, wherein downlink and uplink communication of the UE utilize different antenna panels having different beam application times.

16. The apparatus of claim 1, wherein the at least one processor is configured to:
indicate whether the UE supports different beam application times for uplink and downlink communications in a UE capability signaling or another uplink signaling.

17. A method of wireless communication of a user equipment (UE), comprising:
transmitting, to a base station, a beam application time report for at least one antenna panel of the UE, wherein the beam application time report comprises a time for application of a beam for use by the at least one antenna panel;
applying the beam at the at least one antenna panel of the UE based on the beam application time report in preparation of communication with the base station; and
communicating with the base station using the beam of the at least one antenna panel at least at a time based on the beam application time report.

18. An apparatus for wireless communication at a base station, comprising:
a memory; and
at least one processor coupled to the memory and configured to:
receive, from a user equipment (UE), a beam application time report for at least one antenna panel of the UE, wherein the beam application time report comprises a time for application of a beam for use by the at least one antenna panel;
apply a beam at an antenna array of the base station based on the beam application time report in preparation of communication with the UE; and
communicate with the UE using the beam of the antenna array of the base station at least at a time based on the beam application time report.

19. The apparatus of claim 18, wherein the beam application time report indicates that the time for application of the beam of the at least one antenna panel of the UE comprises a first slot that is at least X ms or Y symbols after receipt, by the UE, of a joint or separate downlink/uplink beam indication.

20. The apparatus of claim 18, wherein the beam application time report indicates that the time for application of the beam of the at least one antenna panel of the UE comprises a first slot that is at least X ms or Y symbols after an acknowledgment, from the UE, of a joint or separate downlink/uplink beam indication.

21. The apparatus of claim 18, wherein the at least one antenna panel of the UE comprises a plurality of antenna panels configured in a panel group, wherein the beam application time report corresponds to the panel group of the plurality of antenna panels of the UE.

22. The apparatus of claim 21, wherein the plurality of antenna panels of the UE have different switch latencies, wherein the beam application time report indicates beam application times based on switch latencies of respective plurality of antenna panels of the UE.

23. The apparatus of claim 18, wherein the beam application time report is based on a panel power saving status of the at least one antenna panel of the UE, wherein the at least one antenna panel is in an active state, a slight sleep state, or a deep sleep state.

24. The apparatus of claim 18, wherein the beam application time report is comprised within a UE capability signal transmitted by the UE, wherein transmission of the beam application time report within the UE capability signal occurs during a connection establishment procedure between the base station and the UE.

25. The apparatus of claim 18, wherein transmission of the beam application time report by the UE is triggered by an occurrence of an event, wherein the event that triggers the transmission of the beam application time report comprises at least a panel group change at the UE or a panel power saving status change at the UE.

26. The apparatus of claim 18, wherein transmission of the beam application time report by the UE occurs periodically, aperiodically, or semi-persistently.

27. The apparatus of claim 18, wherein the beam application time report comprises a first report based on downlink control information (DCI) based beam indication application time or a second report based on medium access control (MAC) control element (CE) (MAC-CE) based beam indication application time.

28. The apparatus of claim 27, wherein a beam application time of the first report or the second report is same or different, wherein the beam application time report includes at least one of the first report or the second report.

29. The apparatus of claim 18, wherein the at least one processor is configured to:
- receive, from the UE, an indication indicating whether the UE supports different beam application times for uplink and downlink communications in a UE capability signaling or another uplink signaling.

30. A method for wireless communication of a base station, comprising:
- receiving, from a user equipment (UE), a beam application time report for at least one antenna panel of the UE, wherein the beam application time report comprises a time for application of a beam for use by the at least one antenna panel;
- applying a beam at an antenna array of the base station based on the beam application time report in preparation of communication with the UE; and
- communicating with the UE using the beam of the antenna array of the base station at least at a time based on the beam application time report.

\* \* \* \* \*